Dec. 11, 1945.   S. M. CANTOR   2,390,507
PRODUCTION OF ALKYL GLYCOSIDES
Filed Jan. 21, 1941   2 Sheets-Sheet 1
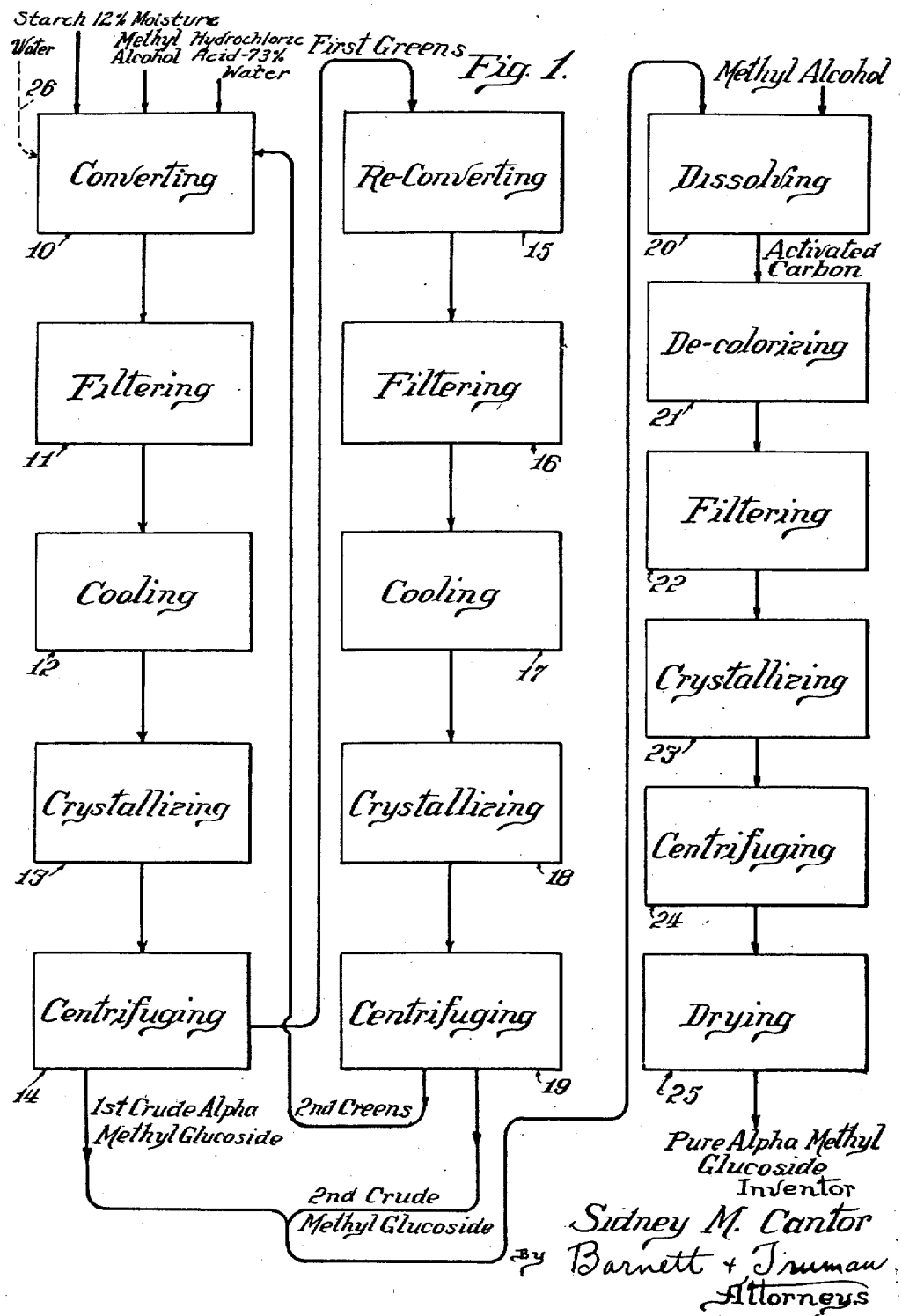

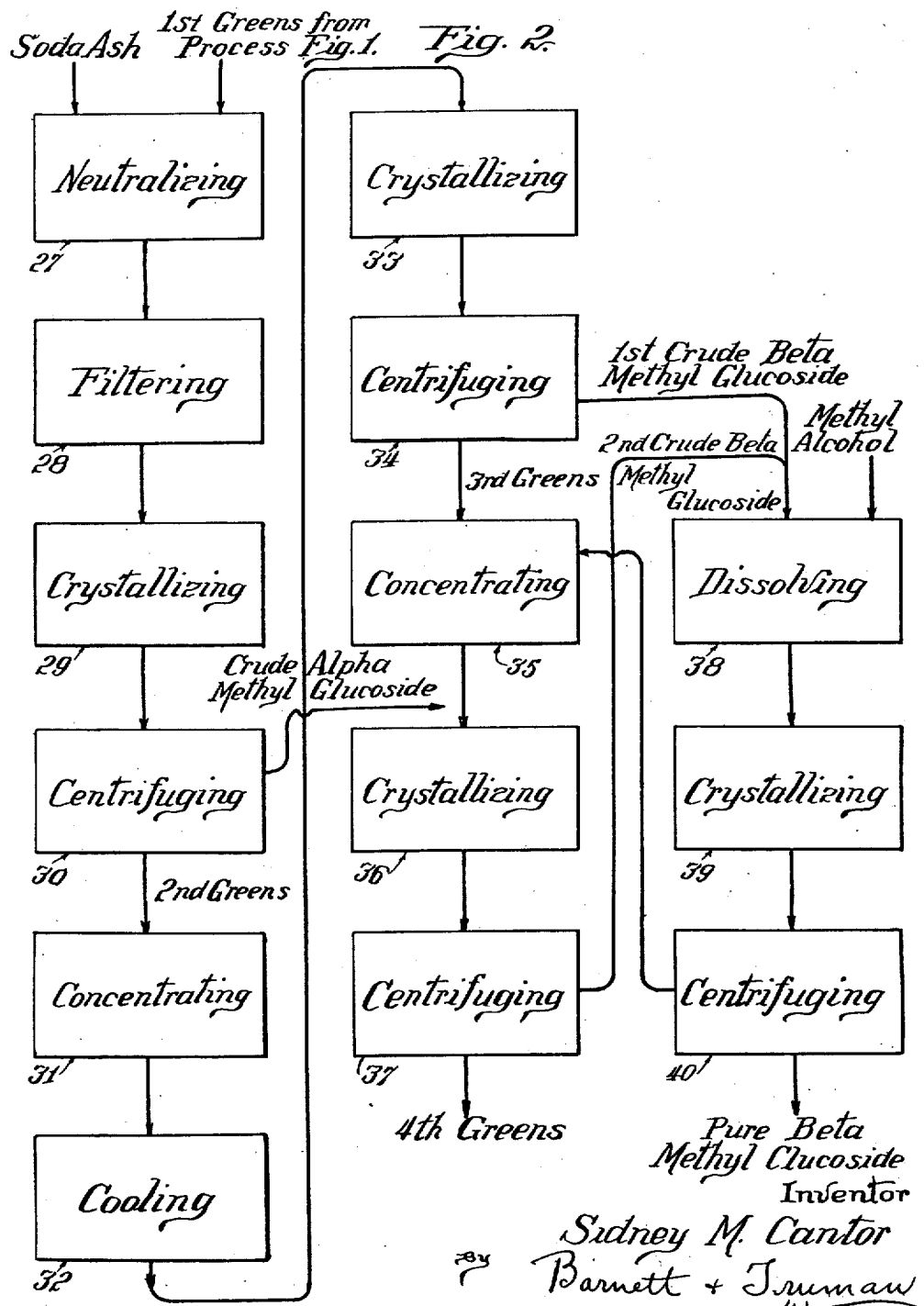

Patented Dec. 11, 1945

2,390,507

UNITED STATES PATENT OFFICE 2,390,507

PRODUCTION OF ALKYL GLYCOSIDES

Sidney M. Cantor, Riverside, Ill., assignor to Corn Products Refining Company, New York, N. Y., a corporation of New Jersey Application January 21, 1941, Serial No. 375,288

25 Claims. (Cl. 260—210)

This invention relates to, and has for its object, the production of, alkyl glycosides directly from reducing saccharide polymers. Methyl glucosides have been produced by heating powdered glucose with methyl alcohol, containing hydrogen chloride, and crystallizing the solution. (Emil Fischer, "The Compounds of Sugars with Alcohols and Ketones," Berichte 28, 1145–1895, Collective volume I, pages 740–741). The process described is an anhydrous operation. The same article states that starch may be treated in the same way to give alpha methyl glucoside.

One of the objects of the present invention is to produce from starch, dextrine or other reducing saccharide polymers, non-crystallizable syrups consisting, dry substance basis, of a major quantity of a glucoside (ethyl, propyl, butyl, amyl) and a minor quantity of reducing saccharide polymer glycosides, together with, optionally, a small quantity of a reducing sugar. These syrups may be used, effectively, as plasticizers for animal glues, in the place of corn syrups, which latter have a tendency to react with and so tan or cure the protein material in the glue, which is not the case with the glycoside syrups. Furthermore, the glycoside syrups of this invention, particularly those produced by the higher alcohols such as propyl, butyl, or amyl alcohols, have the capacity of lowering the surface tension of liquids, such, for example, as the oil and water emulsions used in the lubrication of machine tools. The ethyl glucoside syrups are non-toxic so they may be used in food products.

A further object of the invention is to facilitate the reaction between the alcohol (including also methyl alcohol) and the starch or other reducing saccharide polymer, to increase yields, by using in the alcoholysis converting operation substantial quantities of water—the usual processes being carried out under anhydrous conditions—thereby, also, avoiding the expense and inconvenience of employing anhydrous substances.

The term "glucoside" includes a dextrose or glucose compound wherein the hemi-actal hydroxyl of the aldehyde group of the dextrose molecule has been replaced with an organic radical such as a methoxyl, ethoxyl or other alkoxyl group. The broader term "glycoside" includes any reducing saccharide compound wherein an organic radical has been attached to the carbonyl carbon through oxygen.

The term "polymer of a reducing saccharide" includes, in addition to starch, the preferred dextrose polymer employed as raw material for applicant's invention, the polymers of the aldoses, such for example as dextrine, cellulose and lichenin, which are polymers of dextrose; the polymers of the ketoses, such as inulin, which is a polymer of levulose or fructose; the pentosans which are the polymers of the pentoses, e. g. arabinose and xylose; the pectins, e. g. agar-agar and gum arabic, which are the condensation products of galactose or arabinose with galacturonic acids; the disaccharides, such as sucrose, maltose, lactose, cellobiose and gentiobiose, which by hydrolysis yield simple reducing sugars; and also the polymers of reducing sugar acids of which there are a very large number. Every reducing sugar can be oxidized to an acid, the character of which depends upon the carbon atom on which oxidation takes place and upon the nature of the group attached to such carbon atom, whether a hydroxyl group, an aldehyde group or other group. The process of the present invention may be applied, for example, to the polymers of glucuronic acid, derived from dextrose, which acid has an aldehyde group in its molecule and is therefore a reducing sugar acid. The pectins which are polymers of galacturonic acids are to be included within the term polymers of reducing saccharides, which term comprises, of course, many other substances not specifically named. In fact, any material may, in theory at least, be subjected to the reaction of the present invention to obtain a glycoside, provided the material is of a character to be converted by an acid to a substance containing reducing sugars or reducing sugar acids.

In accordance with the present invention the selected polymer of a reducing saccharide is reacted with an aliphatic compound containing alcoholic hydroxyl group, which is hydrophyllic, i. e. miscible wholly or in part with water. For practical purposes, in order that the yield may be sufficient to make the process worth while, these compounds should not contain more than five carbon atoms. This group of compounds comprises: monohydric alkyl alcohols, e. g. methyl alcohol, ethyl alcohol, normal and isopropyl alcohols, the butyl alcohols and the amyl alcohols. It also comprises the polyhydric alcohols, such as the dihydric group, including the glycols and the trihydric group including glycerine. It also includes aliphatic compounds containing alcoholic hydroxyl groups and acid groups, e. g. lactic, tartaric and citric acids; also aliphatic compounds containing alcoholic hydroxyl groups and amino groups, such as mono-, di- or tri-ethanol amine; also compounds containing alcoholic hydroxyl groups and aldehyde groups such as glycolic aldehyde and glyceraldehyde. The compound may be said to consist of or to contain an ROH group in which OH represents an alcoholic hydroxyl group and R represents any alkyl radical; although for practical purposes, and considering yields, it should be one containing not more than five carbon atoms.

The catalyst used may be any acid which does not decompose the carbohydrate. This will exclude nitric acid, at least in most cases. The most desirable acid is hydrochloric acid because it delivers the greatest number of hydrogen ions per unit volume of the acid.

The reaction may be anhydrous. But this is not necessary or even desirable in most cases. The presence of some water is advantageous (1) because it increases the activity of the acid, i. e. increases ionization and thereby increases yields; and (2) because it increases the susceptibility of the carbohydrate to the desired reaction by facilitating the production of low molecular weight polymers, that is, intermediate conversion products, and this also leads to higher yields. However, the water should be present in such small quantities relative to the quantity of the alcohol (or other ROH equivalent) that in the solvolysis of the carbohydrate the alcoholysis excludes, or in any case, predominates over, hydrolysis. In some cases a certain amount of hydrolysis of the carbohydrate to reducing sugar may take place. In some of the examples to follow "purities" are given, meaning reducing sugar content calculated as dextrose, and this, of course, indicates some hydrolysis of the carbohydrate.

By describing the reaction as one involving the "direct" production of the glycoside from the reducing saccharide polymer, it is not intended to suggest that hydrolysis of the material at an intermediate stage of the process may not take place. What is meant is that no free reducing sugar is produced; except in some cases and in minor quantities as above stated. If hydrolysis does take place, as appears to be the case, it is followed immediately by the alcoholysis without the production of free reducing sugar, in any considerable quantities at least. The alcoholysis is therefore the predominant reaction. The process of conversion of the reducing saccharide polymer to the glycoside is in effect, therefore, a one step process not a two step process.

The degree of intermediate hydrolysis can be varied from a mild hydrolysis, for example one corresponding to the conversion of starch to "glucose" (in the commercial sense), to a hydrolysis corresponding to conversion to maximum dextrose content. Within this range of conversions the alcoholysis will bring about the production of glycosides from the glycoside of the simple mono-sugar, dextrose to glycosides of high polymer reducing saccharides, e. g. the glycosides of reducing dextrines. Between these extremes there will be glycosides of saccharides such as maltose and of trisaccharides.

The following are specific examples of reduction to practice of the invention. It will be understood that these examples are purely typical and informative and are not to be considered as limiting the invention to the specific operating data given. The intention is to cover all equivalents and also all modifications within the scope of the hereto appended claims. In these examples the ranges, sometimes included in parentheses, are workable and practical ranges but not critical. The parts and percentages are by weight unless otherwise indicated.

In the accompanying drawings:

Fig. 1 is a flow sheet illustrating Example 1.
Fig. 2 is a flow sheet illustrating Example 2.

*Example 1.—Alpha methyl glucoside from starch with some water present*

This process is indicated, graphically, in flow sheet Fig. 1. The water may be introduced with each of the ingredients of the batch, the starch, the alcohol and the catalyst or with any one of these materials, or independently of any of them, as indicated by the dotted line 26. The presence of 5% of water from any source is desirable in order to bring about increased ionization and to effect the breaking down of the starch to lower molecular weight polymers. A larger amount of water, however, may be used without hydrolysis resulting in the production of substantial amounts of free dextrose provided the alcohol, or other ROH compound is sufficiently in excess of the water so that alcoholysis predominates over hydrolysis. The theoretical amount of water necessary for hydrolysis is 11.1% based on the weight of the dry starch. But this amount may be exceeded without producing any substantial amount of free dextrose, through hydrolysis, if the ROH compound is in sufficient quantity to make its reaction with the carbohydrate the predominant reaction. The process is preferably carried out as follows:

(a) 100 parts dry substance starch containing about 12% of moisture, the usual moisture in commercial, air dry, corn starch, is mixed with 850 parts of methyl alcohol, the usual commercial anhydrous methyl alcohol, a workable range being between 500 and 1000 parts, and 8 parts of 18° Baumé hydrochloric acid containing about 27% hydrogen chloride and the balance water. The resulting methanol and acid solution will contain about 2.5% hydrogen chloride. The amount of water is in the neighborhood of 18% based on the weight of the starch. A practical range would be from 15% to 20% of water, assuming 850 parts of anhydrous methyl alcohol.

(b) This mixture is transferred to a converter—the converting vessel 10 of Fig. 1—which may consist of a vessel provided with a reflux condenser, but for practical operation is preferably a steam jacketed pressure cooker. The suspension is heated to a temperature of 105° C. (222° F.) and maintained at this temperature for four hours. Possible ranges are 65° C. (150° F.) for 45 hours up to 105° C. (222° F.) for 4 hours.

(c) The converted material is then filtered at 11 to remove unconverted starch.

(d) The material is then cooled at 12 to about 20° C. (68° F.).

(e) The methyl glucoside is then crystallized at 13, the crystallization being preferably a still crystallization, which operation requires about 2–3 hours.

(f) The crude alpha methyl glucoside—about 90 parts by weight, dry substance basis, is separated from the mother liquor by centrifuging as indicated at 14.

(g) The mother liquor, first greens, containing 30 parts of methyl glucoside, dry substance, is reconverted, filtered, cooled, crystallized and centrifuged as indicated at 15, 16, 17, 18 and 19 (Fig. 1) to give a second yield of crude alpha methyl glucoside.

(h) The second greens from the centrifuging operation 19 are returned to the first converting operation at 10.

(i) The second crude methyl glucoside, about 24 parts, dry substance, is added to the first crude methyl glucoside, 90 parts, and the material dissolved at 20 in 250 parts of methyl alcohol.

(j) The solution is decolorized at 21 with 1 part of Darco or other activated carbon and is filtered at 22.

(k) The filtrate is crystallized at 23 by allowing it to stand at room temperature for from 2 to 3 hours and is then centrifuged at 24.

(l) The third greens from this last centrifuging operation are returned, preferably, to the reconversion operation at 15.

(m) The pure alpha methyl glucoside from the last centrifuging operation is dried at 25 and gives a yield of 102 parts, dry substance.

*Example 2.—Production of beta methyl glucoside*

This operation is disclosed graphically in the flow sheet (Fig. 2). The raw material is the first greens from Example No. 1, that is, the greens from the centrifuging operation at 14 (Fig. 1). The process is preferably as follows:

(a) The 30 parts of dry substance first greens is neutralized with anhydrous soda ash or other suitable neutralizing agent, as indicated at 27 (Fig. 2) to stop the conversion.

(b) The neutralized liquor is then filtered at 28.

(c) The filtrate is crystallized at room temperature for two to three hours as indicated at 29.

(d) The massecuite is centrifuged at 30. This gives about 60% of the 30 parts dry substance greens, or 18 parts of dry substance, in the form of crude alpha methyl glucoside which may be transferred to the process of Example No. 1 and refined as described therein.

(e) The greens from the centrifuging operation 30 are concentrated at 31 to about 85° Brix.

(f) The liquor is then cooled at 32 to about room temperature.

(g) The cooled liquor is crystallized for about three hours as indicated at 33.

(h) The massecuite is centrifuged at 34 giving beta methyl glucoside in an amount of about 8.4 parts dry substance.

(i) The greens from the centrifuging operation 34—third greens—are concentrated at 35 to about 85° Brix.

(j) The concentrated liquor is crystallized at 36.

(k) The massecuite is centrifuged at 37 giving about 1.2 parts of second beta methyl glucoside dry substance.

(l) The fourth greens from the centrifuging operation 37 are preferably discharged from the system. The second crude beta methyl glucoside is added to the first crude beta methyl glucoside and dissolved at 38 with 25 parts of methyl alcohol.

(m) The solution is crystallized at 39 for about three hours.

(n) The massecuite is centrifuged at 40 giving 7.2 parts pure beta methyl glucoside dry substance.

(o) The alcoholic solution from the centrifuging operation at 40 is reused, preferably, in the concentrating operation at 35.

*Example 3.—Ethyl glycoside syrup from starch*

2500 parts of air dry starch is mixed with 13,000 parts (10,000 to 15,000 parts) of 95% ethyl alcohol and 982 parts of 18° Baumé hydrochloric acid. The actual criterion is not the weight of the acid but the percentage of acidity of the resulting alcohol-acid solution. This acidity may range between 2% and 5%. The 18° Baumé hydrochloric acid contains about 27% of acid and the balance water. The total amount of water will be about 76% based on the starch, assuming 8% moisture in the starch. This mixture is converted in a steam jacketed pressure cooker, at 37 to 45 pounds steam pressure per square inch, for about three hours (3 to 8 hours). The temperature within the converter liquor should be approximately within the range of 112° C. (234° F.) to 118° C. (244° F.). The pressure is then released and the liquor neutralized with sodium carbonate, caustic soda or any other suitable alkaline material preferably in dry form. The liquor is then filtered, decolorized by the addition of 5% of Darco, based on the weight of the starch, filtered again and evaporated to remove the excess of ethyl alcohol. The product is a syrup of ethyl glycosides having a purity of 3% (reducing sugar calculated as dextrose) and a yield of ethyl glycosides of 97% on the basis of reducing sugars produced by the reaction, that is, the alcoholysis is 97% efficient. The syrup is non-crystallizable; and, because produced by the use of ethyl alcohol, is non-toxic and can be used in food products. The 3% purity indicates that a small amount of free reducing sugar has been produced by hydrolysis.

The non-reducing or glycoside dry substance of the syrup consists of about 90% of ethyl glucoside and about 10% of dextrose polymer glycosides.

This syrup, the glycoside dry substance of which consists of a major portion of ethyl glucoside and a minor portion of dextrose polymer ethyl glycosides, is, it is believed, a new product.

*Example 4.—Ethyl glycoside syrup from dextrine*

3000 parts of dextrine, preferably a white dextrine having a solubility of 85% and a fluidity at 3 parts dextrine to 4 parts of water of 11, and with a moisture content of 6%, (although any other dextrine may be used) is mixed with 14,000 parts of 95% ethyl alcohol (10,000 to 40,000 parts) and 1052 parts of 18° Baumé or 27% hydrochloric acid, and converted for four hours (2 to 8 hours) in a steam jacketed pressure cooker at 45 pounds pressure per square inch (40–50 pounds). The treatment from there on is as described in Example 3 and gives an ethyl glycoside syrup having a purity of about 4% which indicates a yield of about 96% on the basis of Example 3. The characteristics of the product are substantially the same as the product of Example 3.

*Example 5.—Ethyl glycoside syrup from dextrine—Refluxing method*

107 parts of dextrine such, for example, as specified in Example 4, is mixed with 500 parts (400–800 parts) of 95% ethyl alcohol and 38 parts of 18° Baumé hydrochloric acid, and the mixture refluxed for 17 hours (10–24 hours). The subsequent treatment may be the same as in Examples 3 and 4. The product will be an ethyl glycoside syrup containing practically no dextrose indicating, therefore, a yield of 100% on the yield basis of Example 3.

In these examples anhydrous ethyl alcohol could be used in place of 95% ethyl alcohol except for considerations of cost. The relatively large amount of water introduced into the process with the ethyl alcohol is rendered ineffective, or substantially so, in the solvolysis because of the preponderant action of the ROH compound, the alcohol, that is, the reaction is predominantly (in Example 5 exclusively) alcoholysis and not hydrolysis.

The products of Examples 3, 4, and 5 are non-crystallizable syrups because of the presence of the relatively large quantities of conversion products of alcoholysis, or alcoholysis and hydrolysis, intermediate the original starch polymers and the ethyl glycosides or glycosides and dextrose resulting from the solvolysis; the situation being analogous to that which exists in starch syrups known, commercially, as glucoses in which there are present products intermediate starch and dextrose.

*Example 6.—Isopropyl glycoside syrup from starch*

3000 parts of air dry starch is suspended in 14,000 parts of isopropyl alcohol containing 1260 parts by volume of water. That is, the usual water content of commercial isopropyl alcohol is about 9% by volume. The quantity of the isopropyl alcohol may vary within the range of 10,000 to 20,000 parts. With this suspension is mixed 1050 parts of 18° Baumé hydrochloric acid; or sufficient acid to give the alcohol-acid solution an acidity between 2% and 5%. The material is treated in the same manner as indicated in Example 3 and will give an isopropyl glycoside syrup having 7% purity which indicates a yield of 93% on the yield basis of Example 3.

*Example 7.—Propyl glycoside syrup*

The process is the same as in Example 6 with the exception that normal propyl alcohol is used in place of isopropyl alcohol. The product is a propyl glycoside syrup having a purity of 9% indicating a yield of 91%.

*Example 8.—Isobutyl glycoside syrup*

The process is the same as in Example 6 except that isobutyl alcohol is used in place of isopropyl alcohol. The product is an isobutyl glucoside syrup analyzing 13% purity and therefore giving a yield of 87%. The isobutyl alcohol is anhydrous.

*Example 9.—Amyl glycoside syrup*

The process is the same as in Example 6 except that "Pentasol," which is a commercial mixture of various amyl alcohols, is used in place of isopropyl alcohol and the pressure within the pressure cooker is maintained at 25-30 pounds instead of between 40 and 50 pounds. It is necessary to convert at the lower pressure to avoid charring of the starch. The process gives a mixed amyl glycoside syrup having a purity of 14% indicating a yield of 86%.

*Example 10.—Isopropyl glycoside syrup from anhydrous hydrol*

By hydrol is meant the mother liquor of a starch converted solution after the removal, by crystallization, of some of the dextrose. Hydrol will ordinarily have a purity of about 70%, but this purity may vary quite considerably.

The hydrol is dried by distilling it with toluene. 500 parts of the dried hydrol is suspended in 2000 parts (1500 to 3500 parts) of anhydrous isopropyl alcohol. Into this suspension is introduced 3% or 60 parts of dry hydrogen chloride gas. The material is refluxed for 60 hours and filtered to remove about 85 parts of the unreacted hydrol. The liquor is then neutralized with anhydrous soda ash and filtered. The remaining isopropyl alcohol solvent is removed by evaporation. This yields about 400 parts of a viscous isopropyl glycoside material.

*Example 11.—Isopropyl hydrol glycoside syrup by hydrous reaction*

The process is the same as in Example 10 except that an amount of water is used sufficient to increase yields but which will be so small in proportion to the alcohol that alcoholysis predominates over hydrolysis. That is, the process can employ commercial hydrol without drying, and commercial isopropyl ethyl or other alcohol containing some water; with the result, however, that the amount of reducing sugar in the syrup will be increased.

In the last two examples it will be possible to employ, as the carbohydrate ingredient, converter liquors or first greens from the dextrose process in place of hydrol, which term usually refers to a mother liquor from which as much dextrose has been removed by crystalliaztion as is commercially feasible. The advantage of using hydrol is that it is a relatively cheap product.

Examples 6 and 11, inclusive, also give products which are believed to be novel as such. Their characteristics are generally similar to the products of Examples 3 to 5.

*Example 12.—Glycoside syrup from starch by mild conversion*

2500 parts of air dry starch is mixed with 13,000 parts of 95% ethyl alcohol and 600 parts of 18° Baumé hydrochloric acid and the mixture, at an acidity of about 1%, is converted in a steam jacketed pressure cooker at 25 pounds steam pressure per square inch for one hour. The pressure is then released and the liquor neutralized with sodium carbonate. The liquor is then filtered to remove unconverted starch, decolorized by the addition of 5% of Darco based on the weight of the starch, filtered again and evaporated to remove excess of ethyl alcohol. The product is a syrup of ethyl glycosides containing some reducing sugars; the glycoside portion consisting of a minor part of ethyl glucoside and a major part of ethyl glycoside of dextrose polymers. The product differs from syrup of Example 3 in that it contains a substantially greater proportion of high dextrose polymer glycosides.

*Example 13.—Glucoside from maltose*

Two parts of maltose are suspended in 20 parts of anhydrous methyl alcohol and dry hydrogen chloride gas is added so that the liquor has an acidity of 3.5%. The material is refluxed for seven hours, cooled to room temperature, crystallized for 24 hours and centrifuged so as to give 1 part of alpha methyl glucoside.

This example is an instance of the conversion of a disaccharide for the production of a glucoside under anhydrous conditions. If desired water could be added to the reaction in an amount sufficient to produce a higher yield but small enough so that the alcoholysis reaction will predominate over or exclude hydrolysis.

In place of maltose other disaccharides yielding, on hydrolysis, reducing sugars either of the aldehyde or ketone class can be employed. The disaccharides are to be regarded as polymers of reducing sugars.

It will be possible instead of using the alcohol singly to use a mixture of alcohols.

I claim:

1. Process for the production of glycosides directly from reducing saccharide polymers which comprises: reacting a reducing saccharide polymer with an aliphatic compound at least partially miscible with water and containing an alcoholic hydroxyl group, in contact with an acid catalyst and an amount of water sufficient to promote the reaction but small enough, in proportion to the amount of the aliphatic compound, so that the formation of the glycoside is substantially in excess of the formation of free reducing sugar.

2. Process for the production of glycosides directly from reducing saccharide polymers which comprises: reacting a reducing saccharide polymer with an aliphatic alcohol, containing not more than five carbon atoms, in contact with an acid catalyst and an amount of water sufficient to promote the reaction but small enough, in proportion to the amount of the alcohol, so that the alcoholysis predominates over hydrolysis.

3. Process for the production of glycosides directly from dextrose polymers which comprises: reacting the dextrose polymers with an aliphatic compound at least partially miscible with water and containing an alcoholic hydroxyl group, in contact with an acid catalyst and an amount of water sufficient to promote the reaction but small enough, in proportion to the amount of the aliphatic compound, so that the formation of the glucoside is substantially in excess of the formation of free reducing sugar.

4. Process for the production of glucosides directly from dextrose polymers which comprises: reacting the dextrose polymer with an aliphatic alcohol, having not more than five carbon atoms, in contact with an acid catalyst and an amount of water sufficient to promote the reaction but small enough in proportion to the amount of alcohol so that alcoholysis predominates over hydrolysis.

5. Process for the production of glucosides directly from dextrose polymers which comprises: reacting the dextrose polymer with methyl alcohol in contact with an acid catalyst and an amount of water sufficient to promote the reaction but small enough in proportion to the amount of alcohol so that alcoholysis predominates over hydrolysis.

6. Process for the production of glycosides directly from dextrose polymers which comprises: reacting the dextrose polymer with methyl alcohol in contact with an acid catalyst and an amount of water sufficient to promote the reaction but small enough in proportion to the amount of alcohol so that alcoholysis predominates over hydrolysis; crystallizing the methyl glucoside and removing it as the crude glucoside from the converted liquor; dissolving the crude methyl glucoside in methyl alcohol; and recrystallizing the solution for the production of pure methyl glucoside.

7. Process for the production of glucosides directly from dextrose polymers which comprises: reacting the dextrose polymer with methyl alcohol in contact with an acid catalyst and an amount of water sufficient to promote the reaction but small enough in proportion to the amount of alcohol so that alcoholysis predominates over hydrolysis; crystallizing the methyl glucoside and removing the same from the converted liquor; reconverting the mother liquor with methyl alcohol in the presence of an acid catalyst; and crystallizing the reconverted mother liquor to obtain a second yield of methyl glucoside.

8. Process for the production of a non-crystallizable syrup containing ethyl glycosides which comprises: reacting a dextrose polymer with ethyl alcohol, in contact with an acid catalyst and an amount of water sufficient to promote the reaction but small enough in proportion to the amount of alcohol so that alcoholysis predominates over hydrolysis.

9. Process for the production of a non-crystallizable syrup containing ethyl glucosides which comprises reacting starch with ethyl alcohol, in contact with an acid catalyst and an amount of water sufficient to promote the reaction but small enough in proportion to the amount of alcohol so that alcoholysis predominates over hydrolysis.

10. Process for the production of a syrup containing glycosides which comprises: reacting a dextrose polymer with an aliphatic alcohol of from 2 to 5 carbon atoms, in contact with an acid catalyst and an amount of water sufficient to promote the reaction but small enough, in comparison with the alcohol so that alcoholysis predominates over hydrolysis.

11. Process for the production of alpha methyl glucoside which comprises: reacting 100 parts of starch with 500 to 1000 parts of methyl alcohol and 8 parts of 18° Baumé hydrochloric acid at a temperature between 150° F. and 222° F. in the presence of an amount of water sufficient to promote the reaction but small enough, in proportion to the alcohol, so that methanolysis predominates over hydrolysis; crystallizing the methyl glucoside in the liquor resulting therefrom; and removing the liquor from the crystals.

12. Process for the production of ethyl glucoside in the form of a non-crystallizable syrup which comprises: mixing 2500 parts of air dry starch with from 10,000 to 15,000 parts of 95% ethyl alcohol and enough aqueous hydrochloric acid to give the alcohol-acid solution an acidity between 2% and 5% whereby said mixture contains an amount of water sufficient to promote reaction but small enough in proportion to the amount of alcohol so that alcoholysis predominates over hydrolysis; converting the mixture at a pressure of 37 to 45 pounds steam pressure per square inch for 3 to 8 hours; and neutralizing the converted liquor with an alkaline material.

13. Process for the production of a glycoside syrup which comprises reacting a reducing saccharide polymer, in contact with an acid catalyst and an amount of water sufficient to promote the reaction but small enough so that alcoholysis predominates over hydrolysis, with an aliphatic compound at least partially miscible with water containing an alcoholic hydroxyl group but with a mild reaction whereby a minor portion of the resultant glycosides consists of a mono-sugar glycoside while the major portion consists of the glycosides of reducing saccharide polymers.

14. Process for the production of ethyl glucoside in the form of a non-crystallizable syrup which comprises mixing 2500 parts of air-dried starch with about 10,000 to about 15,000 parts of 95% ethyl alcohol and enough aqueous hydrochloric acid to give the alcohol-acid solution an acidity between 1 and 5%, whereby said mixture contains an amount of water sufficient to promote reaction between the alcohol and the starch, but small enough in proportion to the amount of alcohol present so that alcoholysis predominates over hydrolysis; and converting the mixture at a pressure of about 25 to about 45 pounds steam pressure per square inch for about 1 to about 8 hours.

15. Process for the production of ethyl glucoside in the form of a non-crystallizable syrup which comprises mixing 2500 parts of air-dried starch with about 13,000 parts of 95% ethyl alcohol and enough aqueous hydrochloric acid to give the alcohol-acid solution an acidity of about 1% whereby said mixture contains an amount of water sufficient to promote reaction between the starch and the alcohol, but small enough in proportion to the amount of alcohol so that alcoholysis predominates over hydrolysis; and converting the mixture at a pressure of about 25 pounds per square inch for about an hour.

16. Process according to claim 15 wherein the reaction mixture is prepared by mixing 2500 parts of air-dried starch, about 13,000 parts of 95% ethyl alcohol, and about 600 parts of 18° Bé. hydrochloric acid.

17. Process for the production of a non-crystallizable glycoside syrup which comprises reacting, at elevated temperature, a reducing saccharide polymer with an aliphatic compound which is at least partially miscible with water and which contains an alcoholic hydroxyl group, in contact with an acid catalyst and an amount of water sufficient to promote the reaction, but small enough so that alcoholysis predominates over hydrolysis.

18. A non-crystallizable syrup resulting from reaction of a reducing saccharide polymer with an aliphatic compound at least partially miscible with water and containing 2 to 5 carbon atoms and an alcoholic hydroxyl group, in contact with an acid catalyst and an amount of water sufficient to promote the reaction but small enough so that alcoholysis predominates over hydrolysis, which syrup comprises a major portion of glucosides and a minor but appreciable portion of glycosides of reducing saccharide polymers, the substituent aliphatic groups of said glucosides and said glycosides containing from 2 to 5 carbon atoms.

19. A non-crystallizable syrup resulting from reaction of starch and ethyl alcohol, in contact with an acid catalyst and an amount of water sufficient to promote the reaction but small enough so that alcoholysis predominates over hydrolysis, which syrup comprises a major portion of ethyl glucoside and a minor but appreciable portion of ethyl glycosides of dextrose polymers.

20. A non-crystallizable syrup resulting from reaction of starch and amyl alcohol, in contact with an acid catalyst and an amount of water sufficient to promote the reaction but small enough so that alcoholysis predominates over hydrolysis, which syrup comprises a major portion of amyl glucoside and a minor but appreciable portion of amyl glycosides of dextrose polymers.

21. A non-crystallizable syrup resulting from reaction of dextrose polymers with an alcohol having from 2 to 5 carbon atoms, in contact with an acid catalyst and an amount of water sufficient to promote the reaction but small enough so that alcoholysis predominates over hydrolysis, which syrup comprises a major portion of glucosides and a minor but appreciable portion of glycosides of dextrose polymers intermediate said first mentioned dextrose polymers and dextrose, the substituent aliphatic groups of said glucosides and said glycosides containing from 2 to 5 carbon atoms.

22. A non-crystallizable syrup resulting from reaction of a reducing saccharide polymer with an aliphatic compound at least partially miscible with water and containing 2 to 5 carbon atoms and an alcoholic hydroxyl group, in contact with an acid catalyst and an amount of water sufficient to promote the reaction but small enough so that alcoholysis predominates over hydrolysis, which syrup comprises a substantial portion of glucosides and a substantial portion of glycosides of reducing saccharide polymers, the substituent aliphatic groups of said glucosides and said glycosides containing from 2 to 5 carbon atoms.

23. The process which comprises: reacting 100 parts of starch with 500 to 1,000 parts of methyl alcohol and 8 parts of 18° Baumé hydrochloric acid at a temperature between 150° F. and 222° F., in the presence of an amount of water sufficient to promote the reaction but small enough in proportion to the alcohol, so that methanolysis predominates over hydrolysis; crystallizing alpha methyl glucoside in the liquor resulting therefrom and separating the crystals; neutralizing the residual mother liquor after the separation of the crystals to stop the methanolysis; crystallizing alpha methyl glucoside from said residual mother liquor and removing the crystals therefrom; concentrating the then remaining liquor to about 85° Brix and cooling the same to about room temperature to bring about crystallization therefrom of beta methyl glucoside.

24. Non-crystallizable sirup comprising the reaction product of starch, and an alcohol having from 2 to 5 carbon atoms, in contact with an acid catalyst and an amount of water sufficient to promote the reaction but small enough in comparison with the alcohol, so that alcoholysis predominates over hydrolysis, which sirup contains a major quantity of glucosides, and a minor quantity of the glycosides of dextrose polymers, intermediate the starch and dextrose, sufficient to make said sirup non-crystallizing.

25. Non-crystallizable sirup comprising the reaction product of starch, and an alcohol having from 2 to 5 carbon atoms, in contact with an acid catalyst and an amount of water sufficient to promote the reaction but small enough in comparison with the alcohol, so that alcoholysis predominates over hydrolysis, which sirup contains a major quantity of glucosides, a small quantity of free reducing sugar, and a small quantity of the glycosides of dextrose polymers intermediate the starch and dextrose, sufficient to make said sirup non-crystallizable.

SIDNEY M. CANTOR.